United States Patent
An et al.

(10) Patent No.: US 11,575,740 B2
(45) Date of Patent: Feb. 7, 2023

(54) LOAD BALANCING METHOD BASED ON RESOURCE UTILIZATION AND GEOGRAPHIC LOCATION IN ASSOCIATIVE CONTAINER ENVIRONMENT

(71) Applicant: Korea Electronics Technology Institute, Seongnam-si (KR)

(72) Inventors: Jae Hoon An, Incheon (KR); Young Hwan Kim, Yongin-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 17/467,804

(22) Filed: Sep. 7, 2021

(65) Prior Publication Data

US 2022/0078231 A1 Mar. 10, 2022

(30) Foreign Application Priority Data

Sep. 10, 2020 (KR) ........................ 10-2020-0116090

(51) Int. Cl.
*G06F 15/173* (2006.01)
*H04L 67/1021* (2022.01)
(Continued)

(52) U.S. Cl.
CPC .......... *H04L 67/1021* (2013.01); *G06F 9/505* (2013.01); *G06F 9/5077* (2013.01); *H04L 67/1008* (2013.01)

(58) Field of Classification Search
CPC . H04L 67/1021; H04L 67/1008; G06F 9/505; G06F 9/5077
(Continued)

(56) References Cited

U.S. PATENT DOCUMENTS 6,728,748 B1 * 4/2004 Mangipudi ......... H04L 67/1002
   718/105
9,154,735 B2 * 10/2015 Periyannan ............. H04L 65/80
(Continued)

FOREIGN PATENT DOCUMENTS

KR    10-2020-0080458 A    7/2020
KR       10-2154446 B1    9/2020

OTHER PUBLICATIONS

Korean Office Action dated Mar. 3, 2021, in counterpart Korean Patent Application No. 10-2020-0116090 (4 pages in English and 5 pages in Korean).

*Primary Examiner* — Alicia Baturay
(74) *Attorney, Agent, or Firm* — NSIP Law

(57) ABSTRACT

There is provided a cloud management method and apparatus for performing load balancing so as to make a service in a cluster that is geographically close in an associative container environment and has a good resource current status. The cloud management method according to an embodiment includes: monitoring, by a cloud management apparatus, available resource current statuses of a plurality of clusters, and selecting a cluster that owns a first service supported by a first cluster an available resource rate of which is less than a threshold value; calculating, by the cloud management apparatus, scores regarding an available resource current status and geographical proximity of each cluster; and performing, by the cloud management apparatus, load balancing of the first service, based on a result of calculating the scores. Accordingly, a delay in a response speed of a service that is required in a distributed environment can be minimized, and a service can be supported to be processed in a geographically close cluster through analysis (Continued)

of geographical closeness (proximity) between an access location where there is a user request and a cluster in which services are distributed.

19 Claims, 10 Drawing Sheets

(51) Int. Cl.
*G06F 9/50* (2006.01)
*H04L 67/1008* (2022.01)

(58) Field of Classification Search
USPC .......................................................... 709/226
See application file for complete search history.

(56) References Cited

U.S. PATENT DOCUMENTS

| | | | |
|---|---|---|---|
| 9,525,849 B2 * | 12/2016 | Periyannan | ............ G06F 9/5083 |
| 9,906,590 B2 * | 2/2018 | DiVincenzo | ........ H04L 67/5681 |
| 10,567,493 B2 * | 2/2020 | DiVincenzo | ....... H04N 21/8456 |
| 2022/0131934 A1 * | 4/2022 | Oku | ........................ H04L 67/02 |

\* cited by examiner

| Host | Path | Service |
|---|---|---|
| A | /validation | cluster1, cluster2, clsuter3 |
| A | /validation/service1 | cluster1, cluster2 |
| B | /service2 | cluster2, cluster3 |

FIG. 8

LOAD BALANCING METHOD BASED ON RESOURCE UTILIZATION AND GEOGRAPHIC LOCATION IN ASSOCIATIVE CONTAINER ENVIRONMENT

CROSS-REFERENCE TO RELATED APPLICATION(S) AND CLAIM OF PRIORITY

This application is based on and claims priority under 35 U.S.C. § 119 to Korean Patent Application No. 10-2020-0116090, filed on Sep. 10, 2020, in the Korean Intellectual Property Office, the disclosure of which is herein incorporated by reference in its entirety.

BACKGROUND

Field

The present disclosure relates generally to a cloud management method and apparatus, and more particularly, to a cloud management method and apparatus for performing load balancing so as to make a service in a cluster that is geographically close in an associative container environment and has a good resource current status.

Description of Related Art

Recently, in developing applications and making services, using a cloud environment rather than establishing an on-premise server environment is a growing trend. However, when various applications are executed in the cloud environment, there is no change in restrictions on an operating system and a platform, and existing problems of a slow development process and an inflexible application development and distribution method still remain.

In addition, a container-based micro service which efficiently uses internal resources and can distribute and manage applications rapidly on the basis of a few seconds has appeared, but the container-based micro service has a limit to expanding resources in response to increasing user traffic. Such a micro service does not support service migration between container platforms, and requires collaboration between container platforms, which elastically provide extension and availability of the service and are regionally distributed. Therefore, the micro service has problems that it is difficult to flexibly expand resources and to maximize service migration.

To solve these problems, distributed, collaboration type container platform technology has appeared, but it does not provide a traffic distribution (load-balancing) function suitable for a multi-(associative) cluster environment, and thus the problems still exist.

Accordingly, there is a demand for a method for performing load balancing suitable for an associative container environment.

SUMMARY

To address the above-discussed deficiencies of the prior art, it is a primary object of the present disclosure to provide a cloud management method and apparatus for performing load balancing so as to make a service in a cluster that is geographically close in an associative container environment and has a good resource current status.

According to an embodiment to achieve the above-described object, a cloud management method includes: monitoring, by a cloud management apparatus, available resource current statuses of a plurality of clusters, and selecting a cluster that owns a first service supported by a first cluster an available resource rate of which is less than a threshold value; calculating, by the cloud management apparatus, scores regarding an available resource current status and geographical proximity of each of the selected clusters; and performing, by the cloud management apparatus, load balancing of the first service, based on a result of calculating the scores.

Selecting the cluster may include selecting the cluster that owns the first service through an ingress resource.

In addition, selecting the cluster may include classifying clusters owned by services and storing the clusters in the form of a map before detecting the first cluster the available resource rate of which is less than the threshold value, and, when the first cluster the available resource rate of which is less than the threshold value appears in a specific service, selecting a cluster that owns the service in which the first cluster the available resource rate of which is less than the threshold value appears, from the map.

Calculating the scores may include extracting geographic information of a client from a client IP of the first service, and calculating a score regarding geographical proximity according to whether the client and the cluster belong to a same country and a same continent, by comparing the result of extracting and geographic information of each of the selected clusters.

In addition, when the clusters owned by services are classified, calculating the scores may include calculating a score regarding the available resource current status of each cluster, by using a resource analytic engine for calculating an available resource of each cluster, before detecting the first cluster the available resource rate of which is less than the threshold value.

In addition, calculating the scores may include calculating a score regarding an available resource including a CPU resource and a memory resource with respect to each of the clusters.

In addition, calculating the scores may include, when a certain kind of available resource is weighted from among a plurality of available resources, giving a relatively high score to a cluster that has higher availability of the weighted available resource than the other clusters.

In addition, calculating the scores may include: when the scores regarding the available resource current status and the geographical proximity of each cluster are calculated, adding up the scores calculated by clusters; and calculating traffic reception rates by clusters by using Equation 1 presented below in order to perform load balancing of the first service according to the traffic reception rates by clusters:

$$\frac{\text{Cluster }\#N\ sumScore}{\text{Cluster }\#1\ sumScore + \text{Cluster }\#2\ sumScore + \ldots + \text{Cluster }\#N\ sumScore} * 100$$

In addition, the method according to an embodiment of the present disclosure may further include redirecting a domain of a cluster which will receive traffic to a client according to a result of performing the load balancing of the first service, and redirecting may include enabling the client to directly transmit the traffic to the cluster which will receive the traffic, by redirecting along with a status code when redirecting the domain.

According to another embodiment of the present disclosure, a computer-readable recording medium has a computer program recorded thereon to perform a cloud management method, including: monitoring available resource current statuses of a plurality of clusters, and selecting a cluster that owns a first service supported by a first cluster an available resource rate of which is less than a threshold value; calculating scores regarding an available resource current status and geographical proximity of each of the selected clusters; and performing load balancing of the first service, based on a result of calculating the scores.

In addition, according to another embodiment of the present disclosure, a cloud management apparatus includes: a communication unit configured to receive available resource current statuses of a plurality of clusters; and a processor configured to monitor the available resource current statuses of the plurality of clusters, received through the communication unit, to select a cluster that owns a first service supported by a first cluster an available resource rate of which is less than a threshold value, to calculate scores regarding an available resource current status and geographical proximity of each of the selected clusters, and to perform load balancing of the first service, based on a result of calculating the scores.

According to another embodiment of the present disclosure, a cloud management system includes a cloud platform including a plurality of clusters, and a cloud management apparatus which monitors the available resource current statuses of the plurality of clusters, selects a cluster that owns a first service supported by a first cluster an available resource rate of which is less than a threshold value, calculates scores regarding an available resource current status and geographical proximity of each of the selected clusters, and performs load balancing of the first service, based on a result of calculating the scores.

According to embodiments of the present disclosure described above, a delay in a response speed of a service that is required in a distributed environment can be minimized, and a service can be supported to be processed in a geographically close cluster through analysis of geographical closeness (proximity) between an access location where there is a user request and a cluster in which services are distributed.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 is a view illustrating a state in which results of selecting are stored in the form of a map;

DETAILED DESCRIPTION

Hereinafter, the present disclosure will be described in detail with reference to the accompanying drawings.

Figure 1:
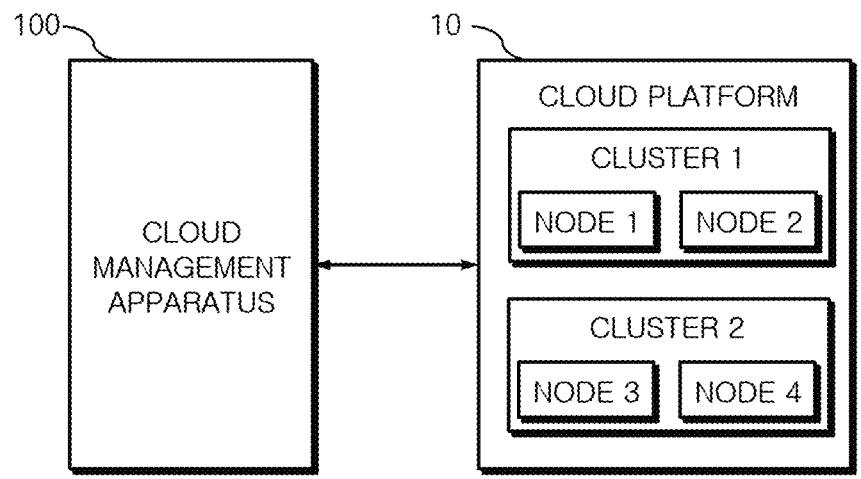
FIG. 1 is a view provided to explain a configuration of a cloud system according to an embodiment of the present disclosure.

FIG. 1 is a view provided to explain a configuration of a cloud system according to an embodiment of the present disclosure.

The cloud system according to the present embodiment may perform load balancing (traffic distribution) to make a service in a cluster which is geographically close in an associative container environment and has a good resource current status.

In addition, the present cloud system may process a service connection cluster selection process through an individual analysis tool (engine) in order to reduce a delay caused when analysis is performed for load balancing.

To achieve this, a cloud platform 10 in the cloud system is managed by a cloud management apparatus 100 as shown in FIG. 1.

Specifically, the cloud management apparatus 100 may monitor available resource current statuses of a plurality of clusters, may select a cluster that owns a first service which is supported by a first cluster the available resource rate of which is less than a threshold value, may calculate a score regarding the available resource current status of each of the selected clusters and geographical proximity, and may perform load balancing of the first service, based on the result of calculating the score.

Herein, the cloud management apparatus 100 may be implemented not only by a physically independent apparatus, but also by being included as a part of a certain device or system or a cloud. In addition, the cloud management apparatus 100 may be implemented in the form of software like a program, a platform, a framework, or application installed in a smartphone, a computer, a server, or a cloud. In addition, respective components of the cloud management apparatus 100 may be implemented by physical components or may be implemented by elements in the form of functions of software.

The cloud platform 10 may be a platform that includes a plurality of servers and provides a cloud service through virtualization, and may be implemented by Docker or Kubernetes, and may be established as a distributed, collaboration type platform environment.

As shown in FIG. 1, the cloud platform 10 may include a plurality of clusters and one cluster may include a plurality of nodes. In addition, at least one pod is included in the node.

Herein, the cluster is a set of a plurality of servers that is virtualized to appear as one server, and may be positioned by region. Specifically, the cloud platform 10 of FIG. 1 may include cluster 1 and cluster 2, and cluster 1 and cluster 2 may be positioned in different regions and zones.

Herein, the region may refer to a continent and the zone may refer to a country.

In addition, the plurality of nodes may be included in one cluster. The node indicates a server unit on the basis of which a real service (or container) is executed. The node performs roles of generating a service and managing a service state, and includes the plurality of pods.

The cloud platform 10 structured as described above performs a function of allocating resources for executing a specific service to a node that is determined by the cloud management apparatus 100.

In addition, the cloud management apparatus 100 may perform a function of managing all clusters as a master. All commands invoke an API server of the cloud management apparatus 100, which is the master, and a node performs a necessary operation while communicating with the cloud management apparatus 100. When a container of a specific node is commanded or a log is inquired, the node is not directly commanded, and instead, the cloud management apparatus 100 is commanded, and accesses the node and responds with a result.

Figure 2:
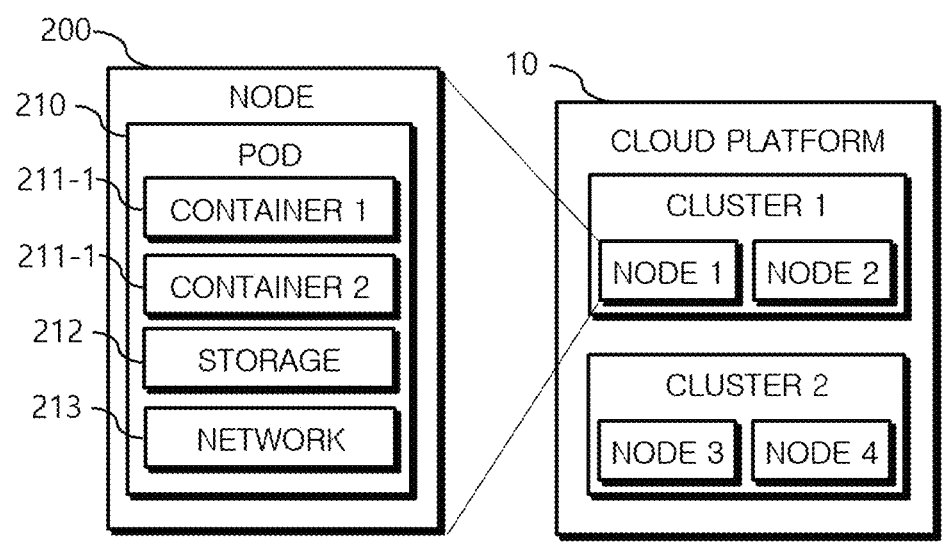
FIG. 2 is a view provided to explain a detailed configuration of a cloud platform according to an embodiment of the present disclosure.

The node includes at least one pod, and the structure of the node described above will be described in detail with reference to FIG. 2. FIG. 2 is a view illustrating a detailed configuration of the cloud platform 10 according to an embodiment of the present disclosure.

As shown in FIG. 2, the cloud platform 10 includes a plurality of nodes 200 and the node may include at least one pod 210.

The node 200 generates a necessary pod 210 while communicating with the cloud management apparatus 100, and configures a storage 212 and a network 213.

The pod 210 is a smallest distribution unit and is where real containers are generated. The pod 210 is generated and managed by a controller or a ReplicaSet, and may be expanded to hundreds of pods or thousands of pods. The pod 210 may be labeled to define its using purpose (GPU specialization, an SSD server, etc.) The pod 210 is a smallest unit that can be distributed in Kubernetes, and has attributes of one or more containers 211, the storage 213, and the network 215. The at least one container 211 included in the pod 210 may share the storage 213 and the network 215, and may access a local host.

The cloud platform 10 includes the plurality of clusters, the plurality of nodes, and the plurality of pods which are structured as described above.

Figure 3:
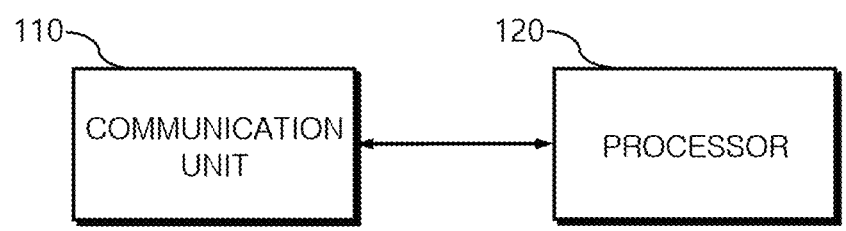
FIG. 3 is a view provided to explain a detailed configuration of a cloud management apparatus according to an embodiment of the present disclosure.

Hereinafter, a configuration of the cloud management apparatus 100 will be described in detail with reference to FIG. 3. FIG. 3 is a view illustrating the cloud management apparatus 100 according to an embodiment of the present disclosure.

As shown in FIG. 3, the cloud management apparatus 100 includes a communication unit 110 and a processor 120.

The communication unit 110 is connected with the cloud platform 10 to communicate therewith, and receive available resource current statuses of the plurality of clusters.

Herein, the available resource current status may include information on a service and information on a traffic reception rate of each cluster for supporting the service. In addition, the information on the service may include at least one of API version information, label information, CPU requirement, memory requirement, storage requirement, policy information, restriction on the number of disorders, and regional information.

The communication unit 110 is a communication means for transmitting and receiving data necessary for operations of the processor, and may perform communication in various wireless communication methods such as Bluetooth, WiFi, near field communication (NFC), cellular, long-term evolution (LTE), or the like, and may also perform communication through wired communication like a wired local area network (LAN).

For example, the communication unit 110 may receive a resource allocation request for a specific service.

The processor 120 controls overall operations of the cloud management apparatus 100.

For example, the processor 120 may perform the role of a master cluster (OpenMCP cluster), and may monitor available resource current statuses of the plurality of clusters, received through the communication unit 110, may select a cluster that owns a first service supported by a first cluster the available resource rate of which is less than a threshold value, may calculate a score regarding the available resource current status of each of the selected clusters and geographical proximity, and may perform load balancing of the first service, based on the result of calculating the score.

To achieve this, the processor 120 may include a resource analytic engine 121 for calculating a score regarding an available resource current status of each cluster, and a load balancing controller 122 for performing load balancing based on the result of selecting the cluster and the result of calculating the score.

Figure 4:
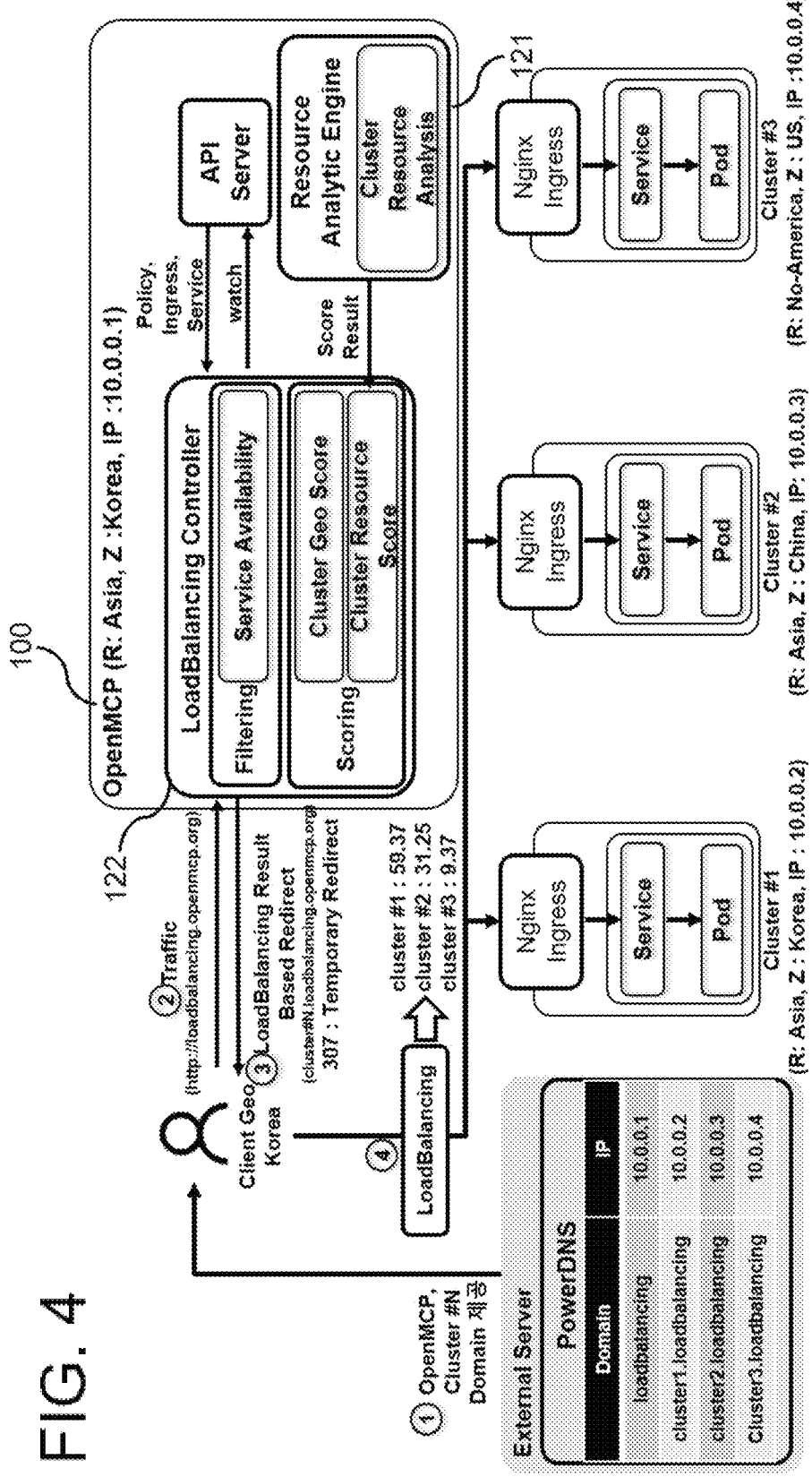
FIG. 4 is a view provided to explain a process of performing load balancing in an associative container environment according to an embodiment of the present disclosure.
Figure 5:
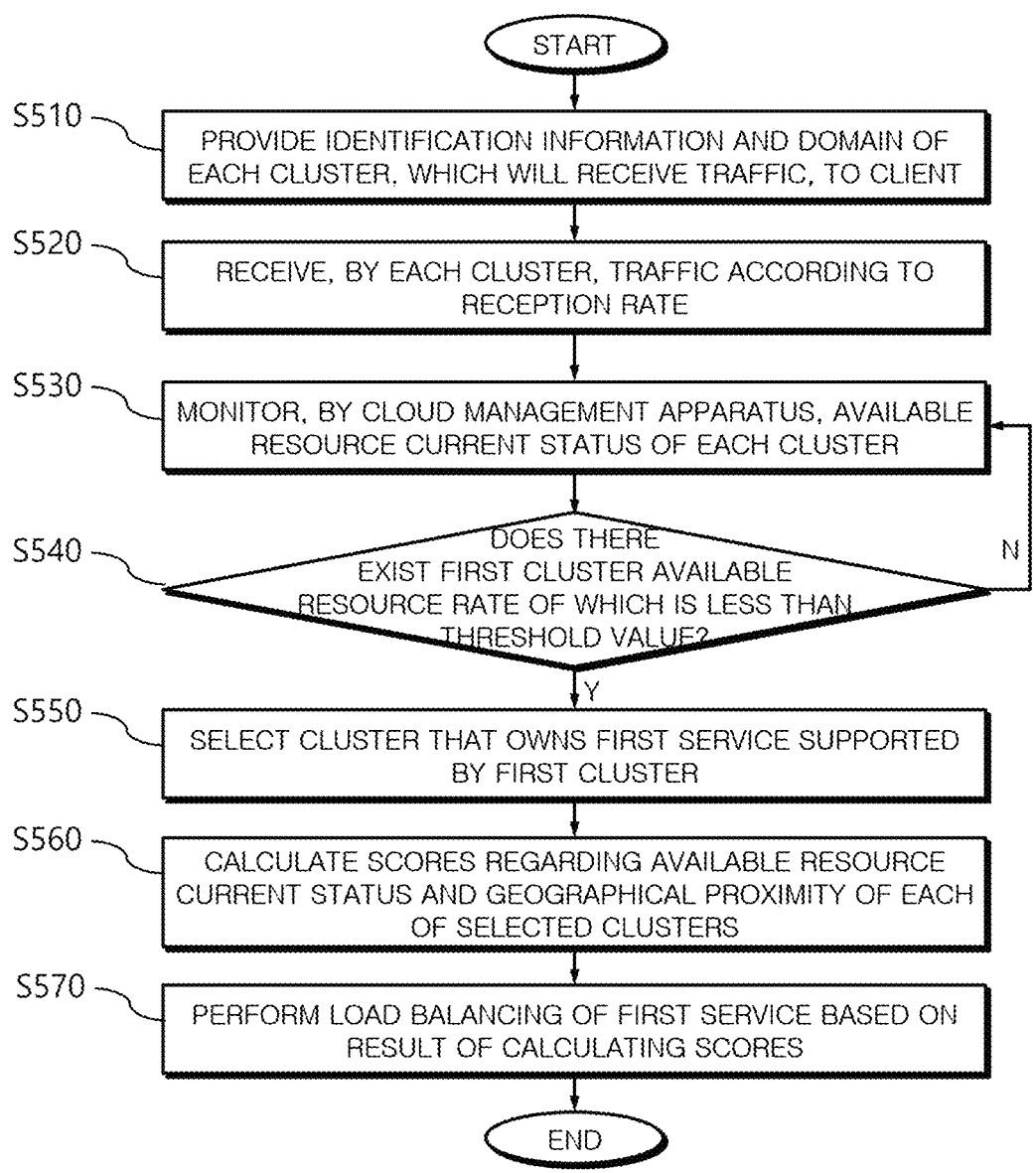
FIG. 5 is a flowchart provided to explain a process of performing load balancing in an associative container environment according to an embodiment of the present disclosure.

FIG. 4 is a view provided to explain a process of performing load balancing in an associative container environment according to an embodiment of the present disclosure, and FIG. 5 is a flowchart provided to explain a process of performing load balancing in an associative container environment according to an embodiment of the present disclosure.

According to a cloud management method according to the present embodiment, when identification information (#N) and a domain of each cluster which will receive traffic are provided to a client through a domain name system (DNS) in an associative container environment (S510), each cluster receives traffic according to a reception rate in order to support a service of the client (S520).

The cloud management apparatus 100 monitors available resource current statuses of the plurality of clusters which receive traffic (S530), and determines whether there exists a first cluster the available resource rate of which is less than a threshold value (S540).

In this case, when there exists the first cluster the available resource rate of which is less than the threshold value (S540—Y), the cloud management apparatus 100 selects a cluster that owns a first service supported by the first cluster, the available resource rate of which is less than the threshold value (S550), and may calculate a score regarding the available resource current status and geographical proximity of each of the selected clusters or all clusters (S560).

In addition, the cloud management apparatus 100 may perform load balancing of the first service in order to support the first service by using a cluster that is geographically close in the associative cluster and has a good resource current status, based on the result of selecting the cluster and the result of calculating the score (S570).

Additionally, FIG. 4 illustrates that load balancing of the first service is performed and the traffic reception rate of the first cluster is 59.37%, the traffic reception rate of the second cluster is 31.25%, and the traffic reception rate of the third cluster is 9.37%.

Figure 6:
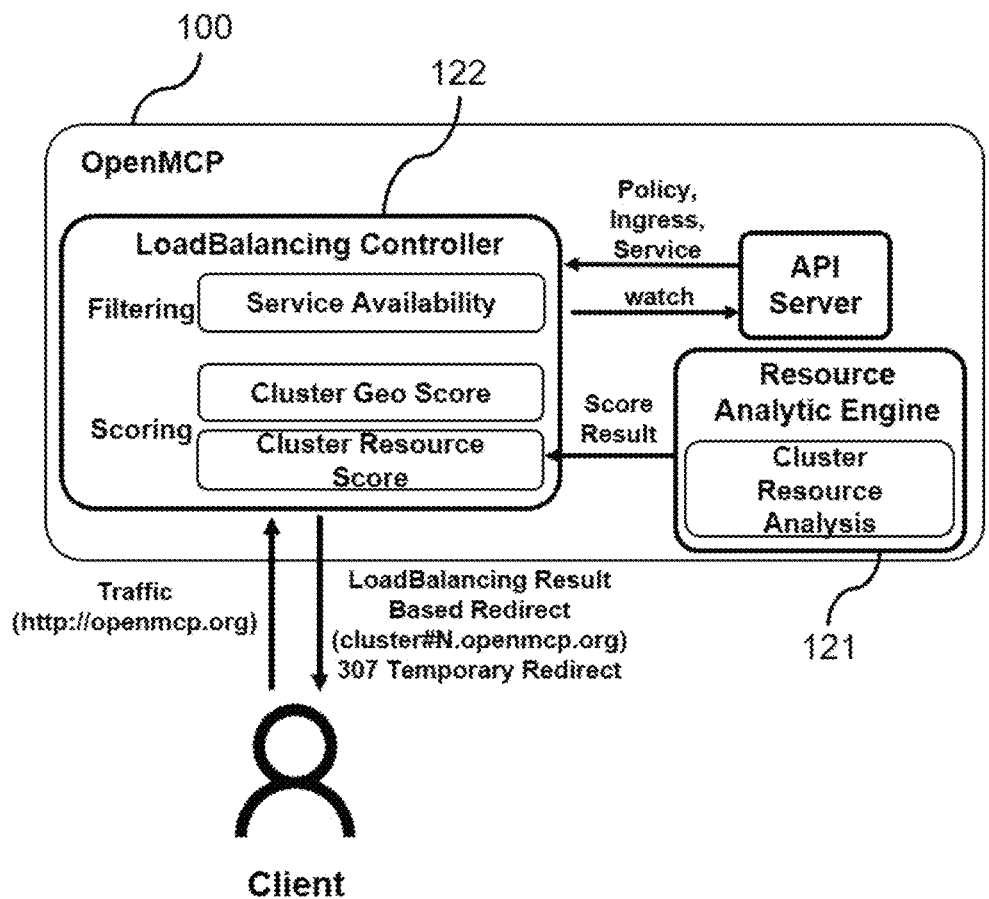
FIGS. 6 and 7 are views provided to explain a process of selecting a cluster and a process of calculating a score in order to perform load balancing according to an embodiment of the present disclosure.
Figure 7:
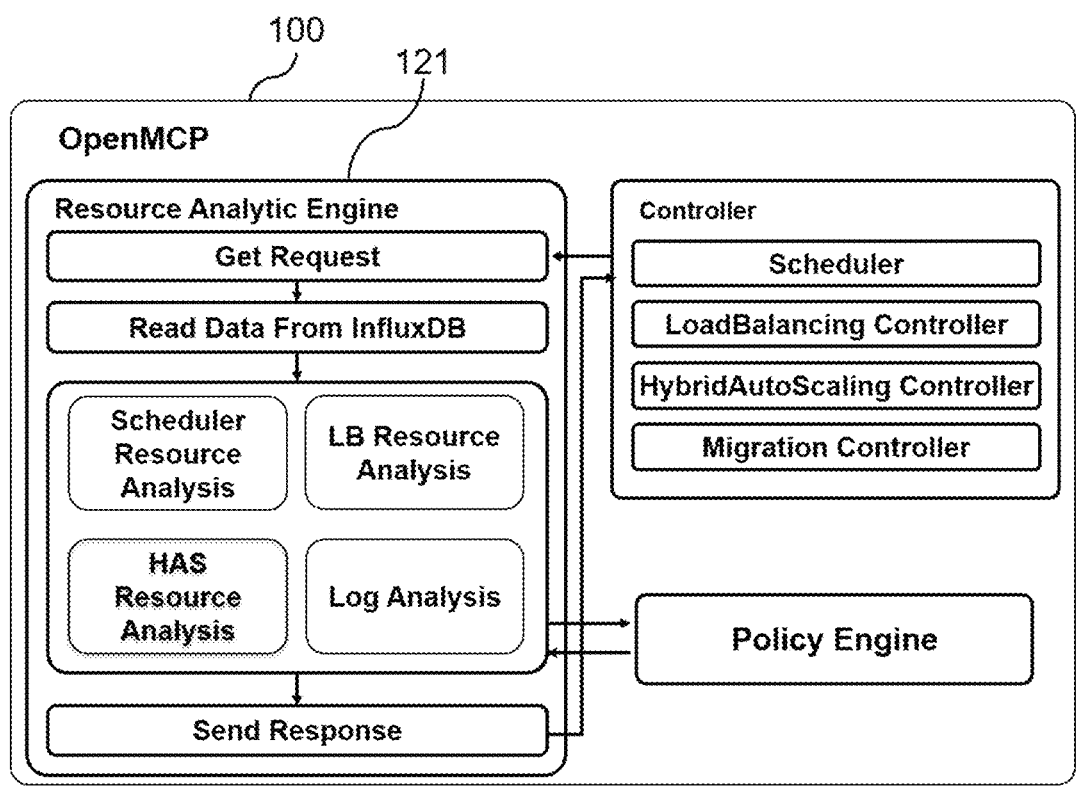
Figure 9:
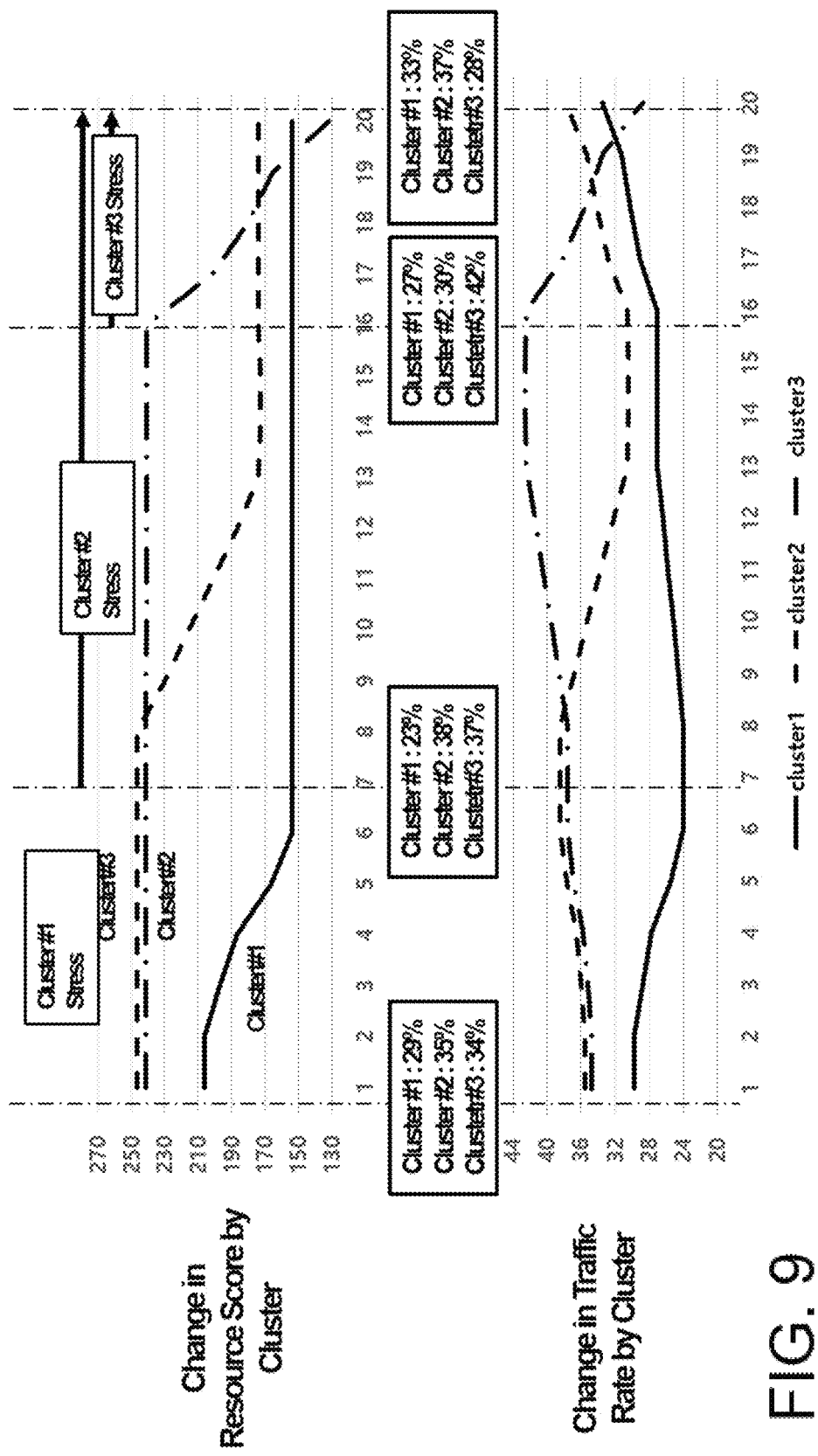
FIG. 9 is a view illustrating a change in resource scores by clusters and a change in traffic rate.
Figure 10A:
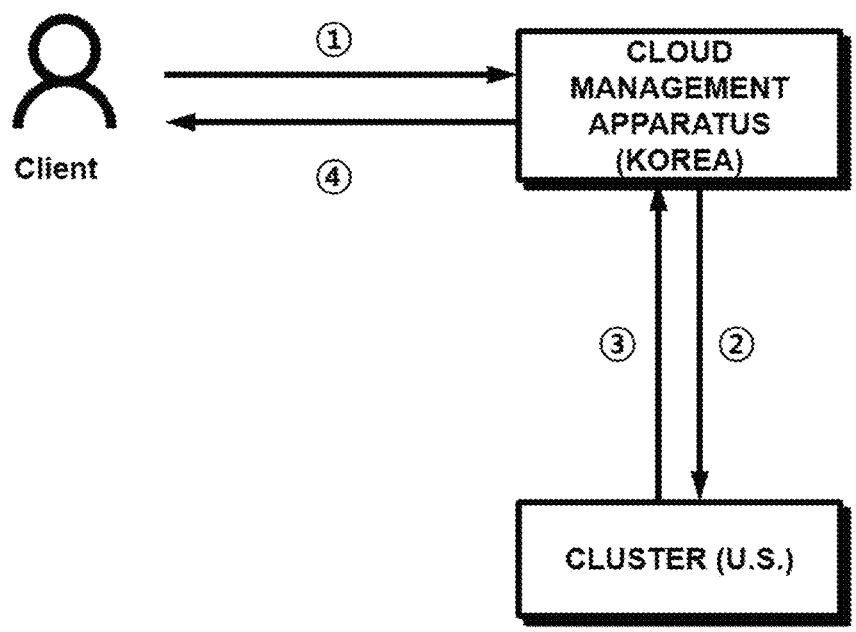
FIGS. 10A and 10B are views provided to explain a process of redirecting a domain of a cluster, which will receive traffic, to a client.
Figure 10B:
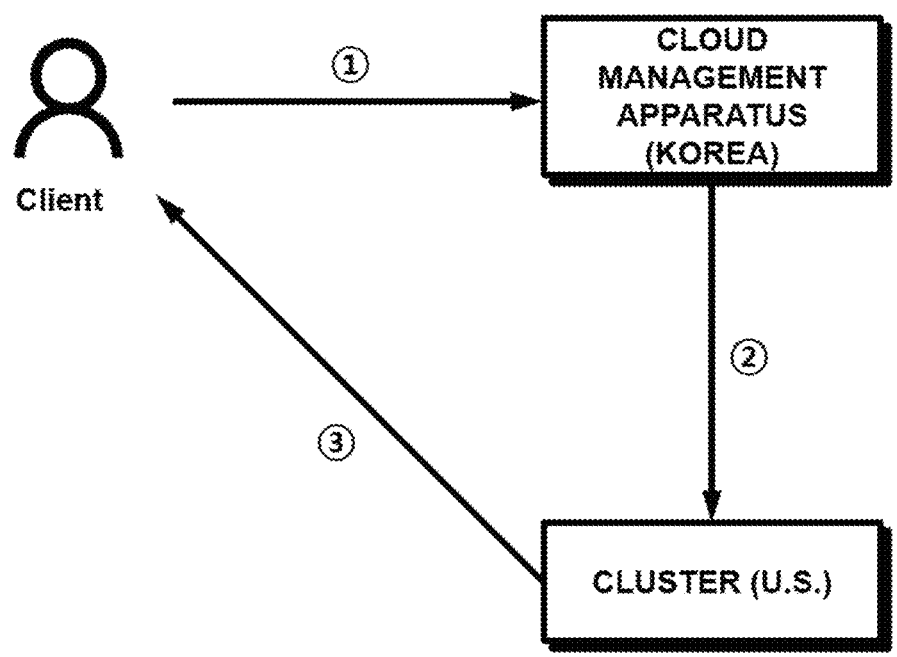

FIGS. 6 and 7 are views provided to explain a process of selecting a cluster and a process of calculating a score in order to perform load balancing according to an embodiment of the present disclosure, FIG. 8 is a view illustrating a state in which results of selecting are stored in the form of a map, FIG. 9 is a view illustrating a change in resource score by clusters and a change in traffic rate, and FIGS. 10A and 10B are views provided to explain a process of redirecting a domain of a cluster that will receive traffic to a client.

Hereinafter, the process of the cloud management apparatus 100 selecting the cluster that owns the first service supported by the first cluster, the available resource rate of which is less than the threshold value, and the process of the cloud management apparatus 100 calculating the score regarding the available resource current status and the geographical proximity of each cluster will be described in detail with reference to FIGS. 6, 7, 8, 9, and 10A and 10B.

As described above, the cloud management apparatus 100 may select a cluster to which the first service is distributed, from among the plurality of clusters constituting the associative cluster, in order to perform load balancing of the first service supported by the first cluster, the available resource rate of which is less than the threshold value.

For example, the cloud management apparatus 100 may select the cluster that owns the first service through an ingress resource, which has ingress to a plurality of nodes and a plurality of pods which are included in a single cluster.

In addition, the cloud management apparatus 100 may classify the clusters owned by services before detecting the first cluster, the available resource rate of which is less than the threshold value, and may store the clusters in the form of a map as shown in FIG. 8, and, when the first cluster the available resource rate of which is less than the threshold value appears in a specific service, the cloud management apparatus 100 may select a cluster that owns the service supported by the first cluster the available resource rate of which is less than the threshold value, from the map.

In addition, FIG. 8 illustrates that the first service (service 1) of the A client is owned by the first cluster (cluster 1) and the second cluster (cluster 2), and the second service (service 2) of the B client is owned by the second cluster (cluster 2) and the third cluster (cluster 3).

Accordingly, when the first cluster has the available resource rate less than the threshold value, the cloud management apparatus 100 may select the first cluster and the second cluster which own the first service supported by the first cluster, and may adjust traffic reception rates of the two clusters (load balancing).

In this case, information on the clusters owned by services, which is stored in the form of a map, may be added and changed by the cloud management apparatus 100 every time a new service is distributed or load balancing of an existing service that is being executed is performed.

The cloud management apparatus 100 calculates a score regarding an available resource current status and geographical proximity of each of the selected clusters or all clusters, in order to perform load balancing of a specific service like the first service.

In this case, the score calculating process may be performed basically for the selected clusters, but, when the clusters owned by services are classified, scores regarding the available resource current statuses of all clusters may be calculated by using the resource analytic engine 121, before the first cluster the available resource rate of which is less than the threshold value is detected.

For example, in order to give a high score to a geographically close cluster and allocate traffic thereto first, the cloud management apparatus 100 may extract geographic information of a client from a client IP of the first service, and may calculate a score regarding geographical proximity according to whether the cluster and the client belong to the same country and the same continent, by comparing the result of extracting and geographic information of each of the selected clusters.

That is, the cloud management apparatus 100 gives a highest score to a cluster that belongs to the same country as the country to which the client of the first service belongs, and gives a medium score to a cluster that belong to a different country from the country to which the client of the first service belongs, but belongs to the same continent, and gives a lowest score to a cluster that belongs to a different country and a different continent from those of the client of the first service.

Specifically, when the first service is made by a client that is positioned in Korea (country-zone) of Asia (continent-region), a cluster that belongs to Korea may be given a score (for example, 100+@) which is a sum of a normal score (for example, 100) and a geographical proximity weighting score included in policy information, a cluster that belongs to China of the same continent, Asia, may be given a normal score (for example, 100), and a cluster of U.S. which belongs to a different country and a different continent may be given a score (for example, 100−@) which is the geographical proximity weighting score, included in the policy information, subtracted from the normal score (for example, 100).

In this case, the cloud management apparatus 100 may store a table of continent information of each country as presented below, and may extract continent information of a client:

| Countries | Continents |
|-----------|------------|
| KR | Asia |
| ... | ... |
| US | North America |

The cloud management apparatus 100 may calculate the score regarding geographical proximity of each of the selected clusters or all clusters in the above-described method.

In addition, the cloud management apparatus 100 may calculate the score regarding the available resource current status of each cluster by using the resource analytic engine 121, which calculates an available resource of each cluster.

Specifically, when the clusters owned by services are classified, the cloud management apparatus 100 may calculate the score regarding the available resource current status of each cluster by using the resource analytic engine 121 before detecting the first cluster the available resource rate of which is less than the threshold value.

When traffic of a specific service increases sharply, load balancing is performed promptly and effectively by using the score regarding the available resource current status of each cluster, which has been already calculated, so that the increasing traffic can be effectively responded.

In addition, the cloud management apparatus 100 may calculate a score regarding an available resource including a CPU resource and a memory resource for each cluster, by using the following equation:

$$\text{Score Calculation}: \frac{\text{Available Resource}}{\text{Total Resource}} * 100 (\text{Resource:CPU, Memory})$$

In this case, the cloud management apparatus 100 may calculate available resources of the CPU resource and the memory resource by using the following equations:

$$\text{Available\_CPU} = \frac{Total_{CPU} - Used_{cpu}}{Total_{CPU}} * 100$$

$$\text{Available\_Memory} = \frac{Total_{Memory} - Used_{Memory}}{Total_{Memory}} * 100$$

In addition, the cloud management apparatus 100 may calculate a score regarding an available resource of a disk resource by using the following equation:

$$\text{Available\_Disk} = \frac{Total_{Disk} - Used_{Disk}}{Total_{Disk}} * 100$$

In addition, when a certain kind of available resource is weighted from among a plurality of available resources, the cloud management apparatus 100 may give a relatively high score to a cluster that has higher availability of the weighted available resource than the other clusters.

Example 1:
Available_CPU=Available_CPU*CPU_Weight

Example 2:
Available_Memory=Available_Memory*Memory_Weight

Example 3:
Available_Disk=Available_Disk*Disk_Weight

That is, the cloud management apparatus 100 may give a weighting score to the available resource of the CPU or the memory, or may give different weighting scores to the CPU and the memory, respectively, according to an available resource weighting score included in the policy information.

In addition, when the scores regarding the available resource current statuses and the geographical proximity of the clusters are calculated, the cloud management apparatus 100 may add up the scores calculated for the respective clusters, and may calculate a traffic reception rate of each cluster by using the following equation, in order to perform load balancing of the first service according to the traffic reception rate of each cluster.

$$\frac{\text{Cluster }\#N\text{ }sumScore}{\text{Cluster }\#1\text{ }sumScore + \text{Cluster }\#2\text{ }sumScore + \ldots + \text{Cluster }\#N\text{ }sumScore} * 100$$

Through this, when the traffic reception rate of each cluster is calculated, the cloud management apparatus 100 may perform load balancing of the first service according to the result of calculating, as shown in FIG. 9.

FIG. 9 illustrates that the scores of the respective clusters are calculated according to the above-describe scoring method, and are added up, the traffic reception rate is calculated according to the result of adding up, and load balancing is performed.

On the other hand, the cloud management apparatus 100 may redirect a domain of the cluster which will receive traffic to the client, according to the result of performing load balancing of the first service.

Specifically, the cloud management apparatus 100 may redirect a status code when redirecting the domain, thereby enabling the client to directly transmit traffic to the cluster which will receive the traffic.

That is, in the related-art technology, the process of responding to a request in a distributed environment includes four steps as shown in FIG. 10A. However, the cloud management apparatus 100 according to the present embodiment specifies a URL to redirect in the process of redirecting the domain of the cluster, which will receive traffic, to the client, and redirects along with a Status Code '307', such that the client can directly transmit traffic to the cluster which will receive the traffic. Accordingly, the process of responding to the request in the distributed environment may include three steps as shown in FIG. 10B.

Example: http.Redirect(writer, request, url, 307).

In this case, the client can directly transmit traffic to the corresponding cluster through the redirected value.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A cloud management method comprising:
monitoring, by a cloud management apparatus, available resource current statuses of a plurality of clusters, and selecting a cluster that owns a first service supported by a first cluster an available resource rate of which is less than a threshold value;
calculating, by the cloud management apparatus, scores regarding an available resource current status and geographical proximity of each of the selected clusters; and performing, by the cloud management apparatus, load balancing of the first service, based on a result of calculating the scores, wherein the calculating the scores comprises:

when the scores regarding the available resource current status and the geographical proximity of each cluster are calculated, adding up the scores calculated by the clusters; and calculating traffic reception rates of the clusters by using a respective ratio between the scores calculated by the selected clusters and scores calculated by the clusters in order to perform load balancing of the first service according to the traffic reception rates of the clusters.

2. The method of claim 1, wherein the selecting the cluster comprises selecting the cluster that owns the first service through an ingress resource.

3. The method of claim 2, wherein the selecting the cluster comprises classifying clusters owned by services and storing the clusters in the form of a map before detecting the first cluster the available resource rate of which is less than the threshold value, and, when the first cluster the available resource rate of which is less than the threshold value appears in a specific service, selecting a cluster that owns the service in which the first cluster the available resource rate of which is less than the threshold value appears, from the map.

4. The method of claim 1, wherein the calculating the scores comprises extracting geographic information of a client from a client IP of the first service, and calculating a score regarding geographical proximity according to whether the client and the cluster belong to a same country and a same continent, by comparing the result of extracting and geographic information of each of the selected clusters.

5. The method of claim 1, wherein, when the clusters owned by services are classified, the calculating the scores comprises calculating a score regarding the available resource current status of each cluster, by using a resource analytic engine for calculating an available resource of each cluster, before detecting the first cluster the available resource rate of which is less than the threshold value.

6. The method of claim 5, wherein the calculating the scores comprises calculating a score regarding an available resource comprising a CPU resource and a memory resource with respect to each of the clusters.

7. The method of claim 5, wherein the calculating the scores comprises, when a certain kind of available resource is weighted from among a plurality of available resources, giving a relatively high score to a cluster that has higher availability of the weighted available resource than the other clusters.

8. The method of claim 1, wherein the calculating the traffic reception rates comprises calculating the traffic reception rates of the clusters by using Equation 1 presented below in order to perform load balancing of the first service according to the traffic reception rates of the clusters:

$$\frac{\text{Cluster \#}N\ sumScore}{\text{Cluster \#1}\ sumScore + \text{Cluster \#2}\ sumScore + \ldots + \text{Cluster \#}N\ sumScore} * 100.$$

9. The method of claim 1, further comprising redirecting a domain of a cluster which will receive traffic to a client according to a result of performing the load balancing of the first service, wherein the redirecting comprises enabling the client to directly transmit the traffic to the cluster which will receive the traffic, by redirecting along with a status code when redirecting the domain.

10. A non-transitory computer-readable recording medium storing instructions that, when executed by one or more processors, cause the one or more processors to perform a cloud management method, comprising:

monitoring available resource current statuses of a plurality of clusters, and selecting a cluster that owns a first service supported by a first cluster an available resource rate of which is less than a threshold value;

calculating scores regarding an available resource current status and geographical proximity of each of the selected clusters; and performing load balancing of the first service, based on a result of calculating the scores, wherein the calculating the scores comprises:

when the scores regarding the available resource current status and the geographical proximity of each cluster are calculated, adding up the scores calculated by the clusters; and calculating traffic reception rates of the clusters by using a respective ratio between the scores calculated by the selected clusters and scores calculated by the clusters in order to perform load balancing of the first service according to the traffic reception rates of the clusters.

11. A cloud management apparatus comprising:

a communication unit configured to receive available resource current statuses of a plurality of clusters; and a processor configured to monitor the available resource current statuses of the plurality of clusters, received through the communication unit, to select a cluster that owns a first service supported by a first cluster an available resource rate of which is less than a threshold value, to calculate scores regarding an available resource current status and geographical proximity of each of the selected clusters, and to perform load balancing of the first service, based on a result of calculating the scores, wherein, for the calculating the scores, the processor is further configured to:

when the scores regarding the available resource current status and the geographical proximity of each cluster are calculated, add up the scores calculated by the clusters; and calculate traffic reception rates of the clusters by using a respective ratio between the scores calculated by the selected clusters and scores calculated by the clusters in order to perform load balancing of the first service according to the traffic reception rates of the clusters.

12. The apparatus of claim 11, wherein, for the selecting the cluster, the processor is further configured to select the cluster that owns the first service through an ingress resource.

13. The apparatus of claim 12, wherein, for the selecting the cluster, the processor is further configured to classify clusters owned by services and store the clusters in the form of a map before detecting the first cluster the available resource rate of which is less than the threshold value, and, when the first cluster the available resource rate of which is less than the threshold value appears in a specific service, select a cluster that owns the service in which the first cluster the available resource rate of which is less than the threshold value appears, from the map.

14. The apparatus of claim 11, wherein, for the calculating the scores, the processor is further configured to extract geographic information of a client from a client IP of the first service, and calculate a score regarding geographical proximity according to whether the client and the cluster belong to a same country and a same continent, by comparing the result of extracting and geographic information of each of the selected clusters.

15. The apparatus of claim 11, wherein, when the clusters owned by services are classified, for the calculating the scores, the processor is further configured to calculate a score regarding the available resource current status of each cluster, by using a resource analytic engine for calculating an available resource of each cluster, before detecting the first cluster the available resource rate of which is less than the threshold value.

16. The apparatus of claim 15, wherein, for the calculating the scores, the processor is further configured to calculate a score regarding an available resource comprising a CPU resource and a memory resource with respect to each of the clusters.

17. The apparatus of claim 15, wherein, for the calculating the scores, the processor is further configured to, when a certain kind of available resource is weighted from among a plurality of available resources, give a relatively high score to a cluster that has higher availability of the weighted available resource than the other clusters.

18. The apparatus of claim 11, wherein, for the calculating the traffic reception rates, the processor is further configured to calculating the traffic reception rates of the clusters by using Equation 1 presented below in order to perform load balancing of the first service according to the traffic reception rates of the clusters:

$$\frac{\text{Cluster } \#N \ sumScore}{\text{Cluster } \#1 \ sumScore + \text{Cluster } \#2 \ sumScore + \ldots + \text{Cluster } \#N \ sumScore} * 100.$$

19. The apparatus of claim 11, wherein the processor is further configured to redirect a domain of a cluster which will receive traffic to a client according to a result of performing the load balancing of the first service,
  wherein the redirecting comprises enabling the client to directly transmit the traffic to the cluster which will receive the traffic, by redirecting along with a status code when redirecting the domain.

* * * * *